(12) United States Patent
Hailpern et al.

(10) Patent No.: US 11,381,793 B2
(45) Date of Patent: Jul. 5, 2022

(54) ROOM CAPTURE AND PROJECTION

(71) Applicant: Ent. Services Development Corporation LP, Houston, TX (US)

(72) Inventors: Joshua Hailpern, Sunnyvale, CA (US); William J. Allen, Corvallis, OR (US); James C. Cooper, Bloomington, IN (US); Kieran McCorry, Belfast Armagh (GB)

(73) Assignee: Ent. Services Development Corporation LP, Houston, TX (US)

( * ) Notice: Subject to any disclaimer, the term of this patent is extended or adjusted under 35 U.S.C. 154(b) by 0 days.

(21) Appl. No.: 17/088,371

(22) Filed: Nov. 3, 2020

(65) Prior Publication Data

US 2021/0120216 A1 Apr. 22, 2021

Related U.S. Application Data

(63) Continuation of application No. 16/688,644, filed on Nov. 19, 2019, now abandoned, which is a continuation of application No. 15/547,656, filed as application No. PCT/US2015/013738 on Jan. 30, 2015, now abandoned.

(51) Int. Cl.
| | | |
|---|---|---|
| *H04N 9/31* | (2006.01) | |
| *H04N 7/15* | (2006.01) | |
| *H04N 5/74* | (2006.01) | |
| *H04M 3/56* | (2006.01) | |

(52) U.S. Cl.
CPC .......... *H04N 9/3194* (2013.01); *H04M 3/567* (2013.01); *H04N 5/74* (2013.01); *H04N 7/15* (2013.01); *H04N 7/157* (2013.01); *H04M 2203/1025* (2013.01); *H04N 7/155* (2013.01); *H04N 9/3144* (2013.01)

(58) Field of Classification Search
None
See application file for complete search history.

(56) References Cited

U.S. PATENT DOCUMENTS

| | | | | |
|---|---|---|---|---|
| 2007/0083625 A1* | 4/2007 | Chamdani | ............ | H04Q 3/0045 709/223 |
| 2009/0119593 A1* | 5/2009 | Hallock | .................... | H04N 7/15 715/719 |
| 2010/0111441 A1* | 5/2010 | Xiong | ....................... | G06T 5/00 382/275 |
| 2011/0103465 A1* | 5/2011 | Chang | .................... | H04N 19/17 375/240.02 |

(Continued)

*Primary Examiner* — Michelle Chin
(74) *Attorney, Agent, or Firm* — Polsinelli PC (57) ABSTRACT

Examples associated with room capture and projection are disclosed. One example includes an information management module that may maintain information regarding a virtual space and a first digital object within the virtual space. The first digital object may be associated with an artifact in a physical space. A room calibration module may map the virtual space to the physical space using sensors to detect attributes of the physical space. A capture module may record a modification to the artifact to be maintained by the information management module. A projection module may project a representation of a second digital object into the physical space. The representation may be projected based on a signal from the information management module.

19 Claims, 6 Drawing Sheets

(56) References Cited

U.S. PATENT DOCUMENTS

2013/0024785 A1\* 1/2013 Van Wie ............... H04M 3/567
715/753
2014/0139426 A1\* 5/2014 Kryze ................ G06K 9/00892
345/156

\* cited by examiner

ROOM CAPTURE AND PROJECTION

CROSS-REFERENCE TO RELATED APPLICATIONS

This application is a continuation of U.S. patent application Ser. No. 16/688,644, filed on Nov. 19, 2019, which is a continuation of U.S. patent application Ser. No. 15/547,656, filed on Jul. 31, 2017 and entitled "Room Capture and Projection", which is a national stage application pursuant to 35 U.S.C. § 371 of International Application No. PCT/US2015/013738, filed Jan. 30, 2015, the disclosures thereof incorporated by reference herein in their entirety.

BACKGROUND

There are two main ways that meetings take place, depending primarily on whether there is a single, appropriate space that is accessible to all parties. If such a space is available, the meeting may be held in that space. If such a space is not available, (e.g., because all available spaces are too small to fit all parties, the parties are spread across great distances), then some form of teleconferencing system may be used. These teleconferencing systems work by transmitting, for example, video, slides, audio, and so forth, to other locations simultaneously so that participants can engage in synchronous communication.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Apparatuses, systems, methods, and equivalents associated with room capture and projection are described. Room capture and projection may be achieved by calibrating a physical space to a virtual space, capturing artifacts in the physical space as digital objects in the virtual space, and projecting digital objects from the virtual space to the physical space. The calibration, capture, and projection may be performed by a device that stores the virtual space or that is in communication with a server storing the virtual space. Calibrating the physical space to the virtual space may facilitate matching attributes of the physical space to attributes of the virtual space. For example, if the virtual space has digital objects on three walls of the virtual space, and the physical space is a room with four walls, one of which is covered with windows, the walls of the virtual space may be oriented for capture and projection purposes so they correspond to the three non-windowed walls of the physical space.

Figure 1:
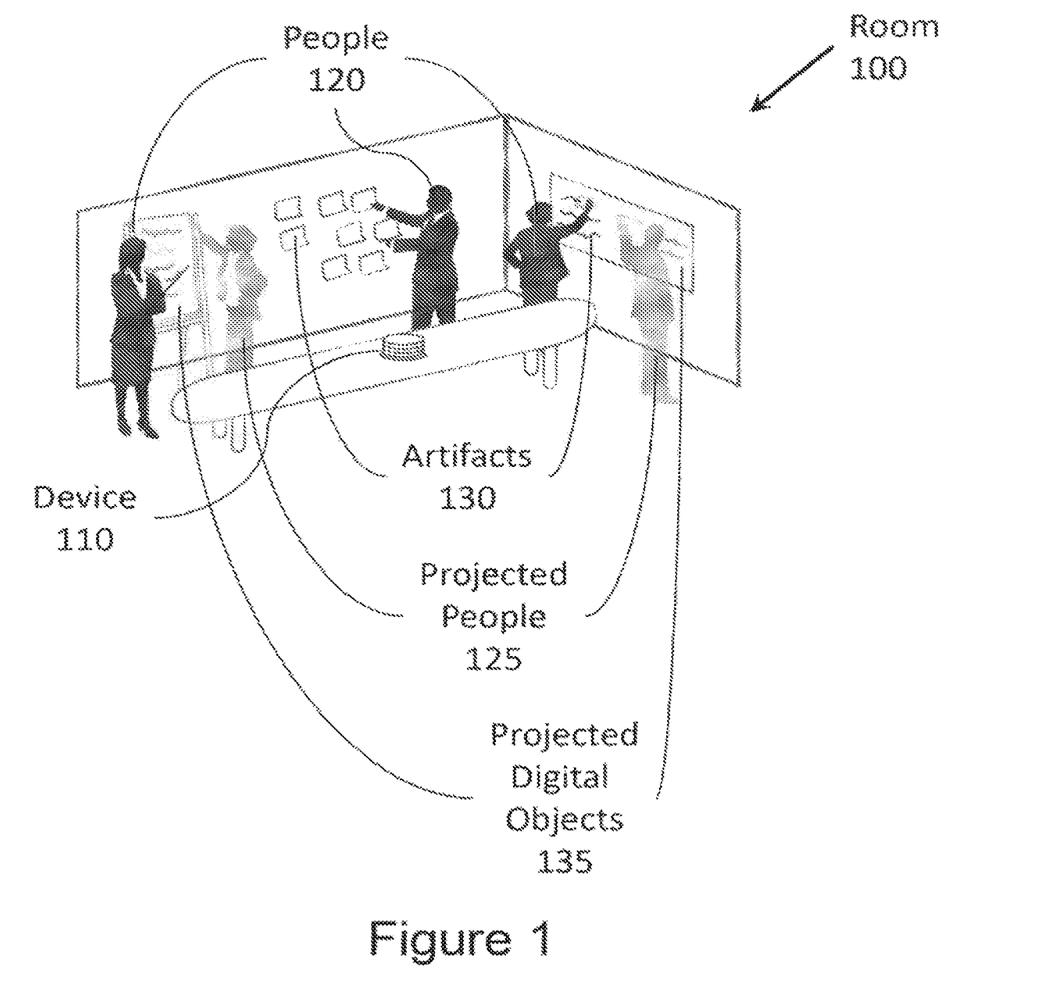
FIG. 1 illustrates an example room, people, and artifacts on which example apparatuses, systems, and methods, and equivalents, may operate.

FIG. 1 illustrates an example room, people, and artifacts on which example systems and methods, and equivalents, may operate. It should be appreciated that the items depicted in FIG. 1 are illustrative examples and many different features and implementations are possible.

FIG. 1 illustrates a room 100. Room 100 may be, for example, a conference room. Room 100 contains a device 110. Device 110 may contain equipment for capturing (e.g., video cameras, high-resolution still image cameras, microphones, motion sensors) actions of people 120 in room 100 as the people 120 interact with artifacts 130 in room 100. Artifacts 130 may include, for example, physical objects and digital content elements available for interaction in room 100. Physical objects may include, for example, note cards, flip charts, models, writing on a whiteboard, and other objects physically present in room 100. Digital content elements may include items projected or displayed in room 100 (e.g., presentation slides, a television screen). In some instances it may also be appropriate to treat people 120 as artifacts. Treating people 120 as artifacts may facilitate capturing actions and interactions of people 120 with other people 120 and with artifacts 130 in room 100.

Device 110 may also contain equipment for projecting (e.g., projectors) or otherwise displaying images including projected people 125 and projected digital objects 135 into room 100. The digital objects 135 and people 125 projected into room 100 may be, for example, stored on device 110 or at a network or Internet location accessible to device 110 in association with a virtual space. Projecting digital objects 135 and people 125 into room 100 may facilitate review and/or interaction with the projected people 125 and the projected digital objects 135. Thus, the projected people 125 and projected digital objects may be projected based on previous recording, simultaneous recording (e.g., a projection of a person or artifact being captured in real time), a combination of the above, and so forth.

As used herein, a virtual space may be a representation of a room that is maintained as data in a data store (e.g., locally within device 110, at a server remote from device 110). Several digital objects may be associated with each virtual space. Each digital object may be associated with an artifact that was at one point stored in the digital space (e.g., by capturing an artifact from a physical space, creating a digital object from a web page or video). Maintaining individual digital objects separately from one another may facilitate review and manipulation of digital objects on an individual basis. By way of comparison, a video camera that records all content in front of it without distinguishing between different persons and/or artifacts in the field of view of the camera may not be able to facilitate review of items recorded at differing times, or interacting with objects in a video after the video has been recorded. By storing digital objects in the virtual space and capturing state changes of the artifacts and/or digital objects, and interactions with the artifacts and/or digital objects, review of two different digital objects at two points in time may be achieved.

Each virtual space in the data store may be associated with a given project, topic, product, and so forth. Thus, when a team working on, for example, a given project associated with a virtual space concludes a meeting and later reconvenes, information associated with the virtual space from the concluded meeting may be quickly recovered by loading the virtual space and projecting digital objects 135 into the new meeting location. By way of illustration, if, during a first meeting, text was written on a white board and a set of post it notes were organized on a different wall, digital objects describing the text and post it notes may be stored to corresponding locations of a virtual space. If the virtual space is loaded at a later time, representations of the digital objects may be projected, effectively recovering a state of the previous room.

In some examples, device 110 may also contain communication equipment (e.g., network card, Bluetooth functionality) to facilitate transmitting information associated with artifacts 130, and so forth. The information associated with artifacts 130 may be transmitted to, for example, a remote server, another device operating in a different location, and so forth. Alternatively, device 110 may contain memory (e.g., a hard disk) for storing information associated with artifacts 130. The information associated with artifacts may be stored, whether remotely or locally, as digital objects in association with a virtual space. The communication equipment may also facilitate controlling other electronic devices within room 100, control of device 110 via other electronic devices, and so forth. Controlling other electronic devices may facilitate, for example, device 110 causing representations of digital objects to be projected into room 100 via, for example, monitors, screens, smart boards, and so forth within room 100.

As mentioned above, to facilitate reconstruction of artifacts into the new meeting location, digital objects associated with a given virtual space may be given "locations" within the virtual space. These locations within the virtual space may facilitate preservation of, for example, relative spatial relationships between artifacts and people over time.

To facilitate preservation of these spatial relationships, it may be important for device 110 to calibrate room 100 to the virtual space. In some examples, this may mean orienting the virtual space to room 100 so that representations of digital objects projected back into room 100 are projected onto suitable locations within room 100. By way of illustration, it may be difficult for people 120 to view and/or interact with representations of digital objects 135 projected onto windows. Similarly, it may be preferable to select projection locations on walls that are largely free from obstructions and/or decorations to ensure representations of digital objects are projected clearly and onto suitable surfaces within room 100 (e.g., blank white walls). Calibrating room 100 may also facilitate detecting artifacts 130 within room 100 so that digital objects for artifacts 130 can be stored to the virtual space. Calibrating room 100 may also facilitate adjusting for light sources and/or ambient light in room 100, manipulating projected digital objects and/or projected people based on colors of surfaces onto which they will be projected, and so forth.

Various techniques may be used to calibrate room 100 to the virtual space. For example, device 110 may contain various sensors (e.g., infrared sensors for distance mapping), logics and so forth for identifying attributes of room 100 so that room 100 can be calibrated to the virtual space.

As an artifact is interacted with and modified over time, the interactions and attributes may be recorded by device 110 and associated with a corresponding digital object in a virtual space. When a representation of the artifact is ultimately projected, the representation projected may be associated with a specific state or prior interaction. This may facilitate reviewing a variety of prior states of the artifact, discussions relating to the artifact, and/or changes made to the artifact over time.

In FIG. 1, device 110 is illustrated as seated atop a table within room 100. In this example, device 110 may be a mobile unit that can be transported from room 100 to a different room as necessary if people 120 need to continue their meeting at another location or time. This may allow many different spaces to be converted into a meeting room to handle relocations, space availability issues, and so forth.

In another example, device 110 may be built into the conference room allowing the creation of designated collaboration rooms. Though designated collaboration rooms may create a limited resource that is competed over by various projects within an organization, there may be reasons for using designated collaboration rooms over mobile units. For example, a room built to house a device may be able to be designed to better accommodate recording and/or projection equipment. For example, projectors hung from the ceiling may create larger projections than one placed on a surface (e.g., a table) within a room. Further, for the purpose of this application, the term "projecting" as used with respect to a digital object includes displaying the digital object, as a representation of a digital object projected onto a segment of a wall may be functionally equivalent to a representation of a digital object displayed on a monitor on a wall instead. Additionally, a designated space may be designed so that surfaces within the room are more amenable to preserving spatial relationships of artifacts within a digital representation of the room (e.g., in a virtual space).

In room 100, three people 120 are having a meeting discussing a topic (e.g., a project, a problem, a product). The people are interacting with artifacts 130 including text on a white board, and a set of post it notes. Additionally, device 110 is also projecting several projected people 125 and projected digital objects 135 into room 100. As mentioned above, device 110 may treat people 120 as though they were also artifacts for the purposes of capturing digital objects associated with the people 120 and/or projecting representations of the people 120. The projected people 125 and projected digital objects 135 may be associated with digital objects in a virtual space that were captured during a previous meeting. Consequently, some of the projected people 125 may be projections of some of the people 120 currently in room 100. Thus, device 110 may allow the people 120 to review their previous conversations and interactions with artifacts from a previous meeting. This may reduce information loss between meetings and enhance productivity.

Alternatively, the projected people and projected artifacts may be in a separate room with their own device that is in communication with device 110. Consequently, device 110 may be interacting with a virtual space that is being used by multiple groups of people 120 simultaneously. Once rooms are calibrated to the virtual space, artifacts 130 and people 120 may be projected into other rooms as projected people 125 and projected digital objects 135 to facilitate synchronous communication. This type of synchronous communication may be desirable when all parties do not fit in a single room, or parties are spread among different physical locations (e.g., in different cities).

Using recording equipment, device 110 may record interactions of people 120 with artifacts 130, projected digital objects 135, and so forth in room 100. These interactions may include modifying artifacts 130, creating artifacts 130, removing artifacts 130, discussing artifacts 130, and so forth. These interactions may then be stored in device 110 or transmitted to a remote server storing a virtual space.

By way of illustration, consider the person 120 in room 100 interacting with the notes attached to the wall. In one example, each note may be treated as an individual artifact. If the person interacting with the notes rearranges the notes or modifies a note (e.g., by writing on the note), device 110 may record these interactions and/or modifications and cause these modifications to be stored as digital objects in a virtual space.

In other examples, device 110 may facilitate projection of artifacts 130 and/or interactions with artifacts 130 at a later time and/or in a different room. By way of illustration, if the people 120 in room 100 have time limited schedules but plan to reconvene the next day in a different room, device 110 may allow the people 130 to resume their meeting by projecting representations of digital objects into the different room. Consequently, because the different room may have different features (e.g., the different room has windows while room 100 does not), device 110 may identify suitable locations within the different room at which to project the representations. This may preserve meeting states over time so that meetings regarding projects can continue where they left off and so artifact states and/or discussions may be reviewed as necessary.

These features may add additional functionality beyond some meeting room setups involving a set of video recording equipment and either a set of displays (e.g., televisions, monitors) or projectors. Though meetings in these types of rooms may be recorded, the recordings may not individually track components over time and preserve state changes. Consequently, such a setup, if recording functionality exists at all, might require replaying everything going on in one of these rooms, without being able to separate and control review of individual components on their own. Additionally, if preserving a meeting state at the end of a meeting is desirable, certain artifacts may need to be preserved. Though maintaining a model may be easy, maintaining notes written on a whiteboard may require more effort. If the notes have been captured over time by device 110, the notes may be automatically preserved and recovered once the appropriate virtual space is loaded using device 110 (or a similar device).

Various techniques may be used by people 120 to interact with device 110 for the purpose of designating artifacts in room 100 and/or interacting with the artifacts in a manner that will be preserved by device 110 as digital objects. By way of illustration, having specified commands for controlling device 110 may prevent device 110 from inadvertently treating room decorations or unrelated materials within room 100 as relevant artifacts 130 to be preserved and projected.

These commands may include, for example, gesture commands, oral commands, commands received from input devices, and so forth. Gesture commands may be detected using, for example, the recording devices being used to track interactions with artifacts, skeleton tracking, and so forth. Oral commands may be detected using, for example, a microphone within device 110. Input devices may include, for example, pointer devices (e.g., laser pointer), wearable technology, tablets, personal computers, other computing devices, and so forth. In some cases, smart technology (e.g., Bluetooth enabled touch screen) may also facilitate command input to device 110. Contextual information may also be considered by device 110. By way of illustration, if a participant begins interacting with an item in a physical location not previously treated as an artifact, device 110 may create a digital object associated with the item and begin treating the item as an artifact.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. A module may include a software controlled microprocessor, a discrete module (e.g., ASIC), an analog circuit, a digital circuit, a programmed module device, a memory device containing instructions, and so on. Modules may include one or more gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
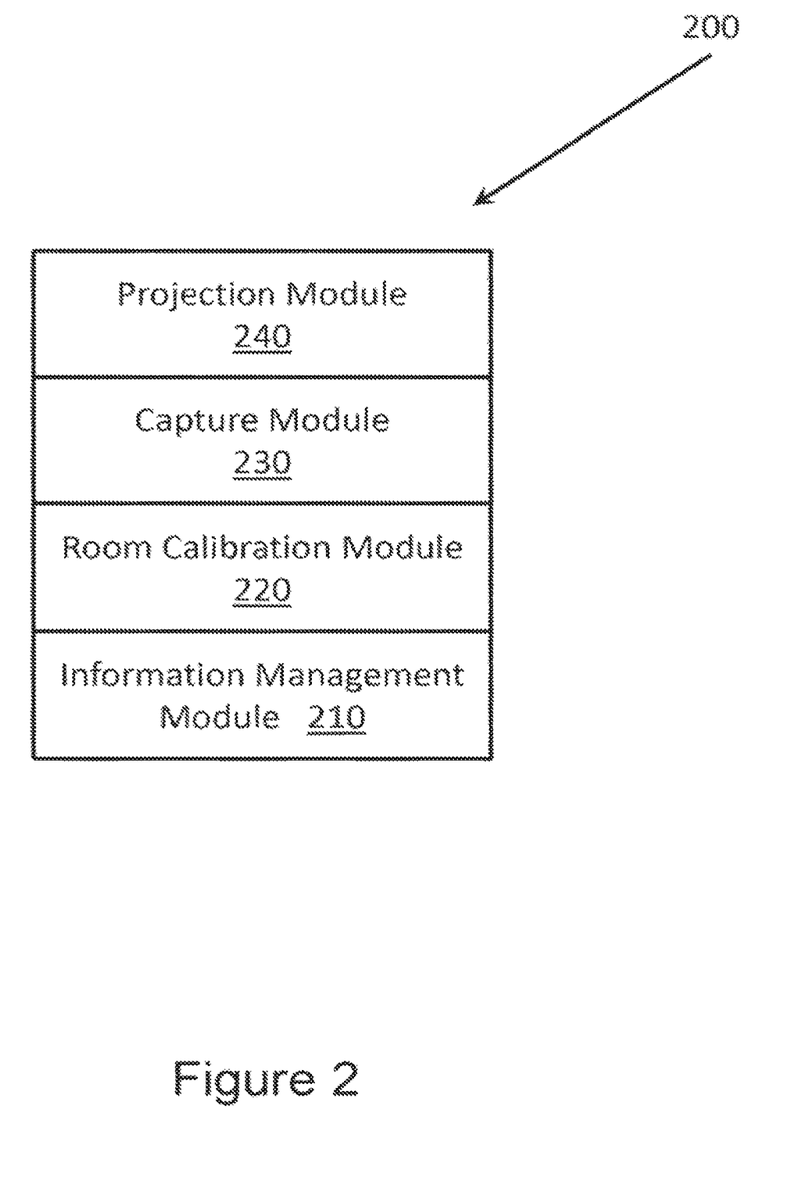
FIG. 2 illustrates an example apparatus associated with room capture and projection.

FIG. 2 illustrates an example apparatus 200 associated with room capture and projection. Apparatus 200 includes an information management module 210. Information management module 210 may maintain information regarding a virtual space and a first digital object. The first digital object may be maintained within the virtual space. The first digital object may be associated with an artifact in a physical space. In one example, information management module 210 may include a data store. In this example, information management module 210 may maintain information regarding the virtual space and the first digital object in the data store. Consequently the data store may contain many virtual spaces and digital objects associated with the virtual spaces. Each virtual space may be associated with, for example, a topic, a project, a user, and so forth. In another example, information management module 210 may maintain information regarding the virtual space and the first digital object by communicating data regarding the virtual space and the first digital object to a remote server.

Apparatus 200 also includes a room calibration module 220. Room calibration module 220 may map the virtual space to the physical space. Room calibration module 220 may map the virtual space to the physical space using sensors to detect attributes of the physical space. The attributes may include, for example, suitable locations for projection of items (e.g., digital objects) associated with the virtual space, a size of the physical location, distances to walls in the physical location, a baseline state of the physical location, and so forth. Calibrating the virtual space to the physical space may facilitate capturing artifacts in the physical space to the virtual space and projecting representations of digital artifacts into the physical space at locations that correspond between the physical space and the digital space.

Apparatus 200 also includes a capture module 230. Capture module 230 may record a modification to the artifact. Consequently capture module 230 may comprise components to facilitate capture of, for example, audio, video, still images, and so forth, associated with the artifact. The modification to the artifact may be maintained by information management module 210. In various examples, the modification to the artifact may be maintained in association with the digital object in the virtual space.

For example, upon initially detecting the artifact, capture module 230 may provide data to information management module 210 that causes information management module 210 to create the digital object, and to store data regarding a first state of the artifact. Upon detecting the modification to the artifact, capture module 230 may provide data to information management module 210 that causes information management module 210 to store data regarding the second state of the artifact.

The modification to the artifact may be, for example, moving the artifact to a different location within the physical space, destroying the artifact, creating the artifact, interacting with the artifact, and so forth. Different modifications may be possible depending on the type of artifact being recorded. For example, text written on a white board may be added to, erased, and so forth. A slideshow may be advanced and so forth. A person being treated as an artifact may move around the room, interact win other artifacts, and so forth.

Apparatus 200 also includes a projection module 240. Projection module 240 may project a representation of a second digital object into the physical space. The second digital object may be projected based on a signal from information management module 210. In the example above, where information management module 210 communicates with a remote server regarding the virtual space and the first digital object, the remote server may also communicate with a second apparatus that provides data to the remote server regarding the second digital object. In this example, the remote server may then provide data regarding the second digital object to information management module 210, and this data may then foe used as the basis for the projection of the second digital object by projection module 240. The projection may facilitate interacting with the representation of the digital object. In this case, capture module 230 may provide information regarding these interactions to information management module 210, which may store the interactions in association with the digital object in the virtual space. In cases where a second apparatus is providing data regarding a second digital object, the second apparatus may be in a second physical space capturing artifacts and projecting digital objects. Consequently, the apparatus and the second apparatus may facilitate synchronous communication between people in different physical spaces.

Figure 3:
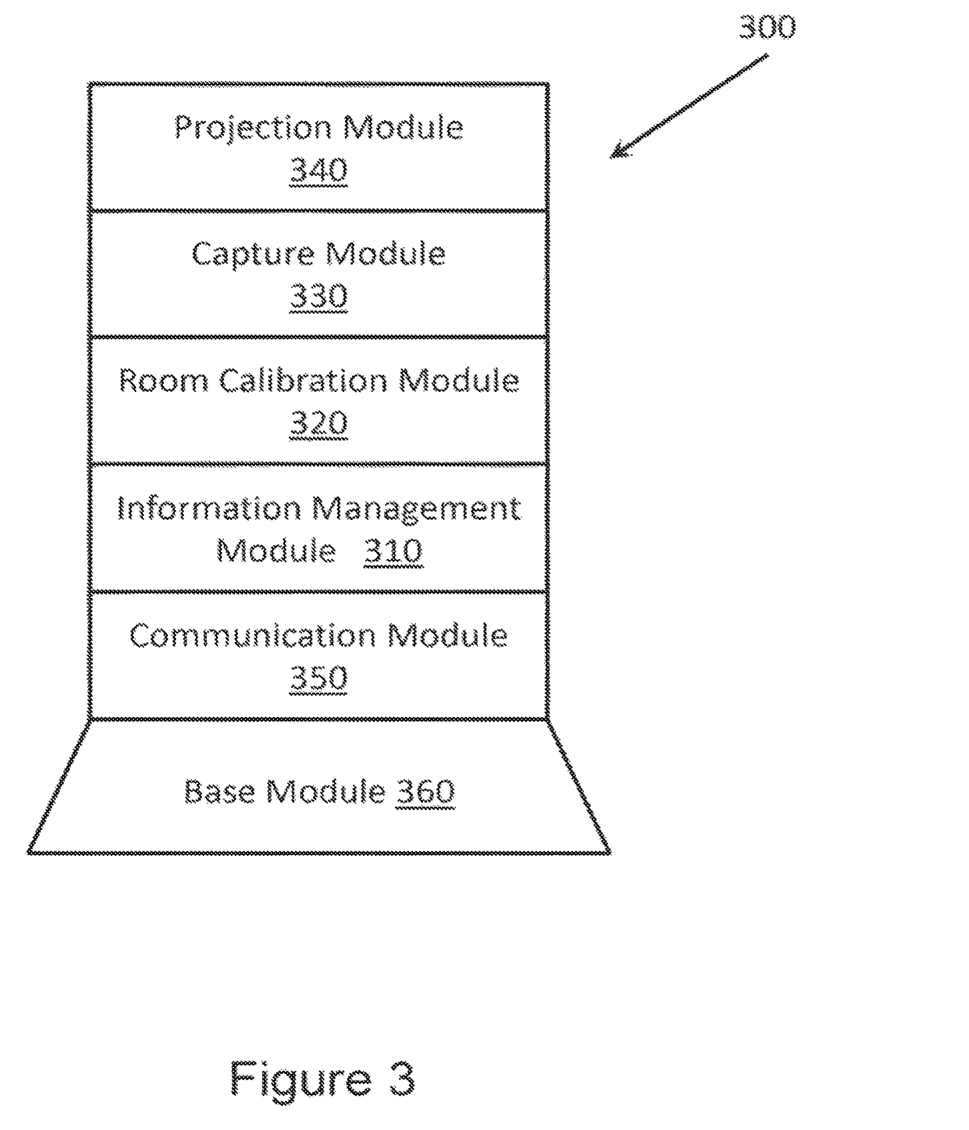
FIG. 3 illustrates another example apparatus associated with room capture and projection.

FIG. 3 illustrates an apparatus 300. FIG. 3 includes many items similar to those described above with reference to apparatus 200 (FIG. 2). For example, apparatus 300 includes an information management module 310, a room calibration module 320, a capture module 330, and a projection module 340.

Apparatus 300 also includes a communication module 350. Communication module 350 may facilitate communication between apparatus 300 and other devices within a physical space. In various examples, communication module 350 may use, for example, Bluetooth, Wi-Fi, Ethernet, Universal Serial Bus, and so forth to facilitate communication between apparatus 300 and other devices within the physical space. Communication module 350 may facilitate, for example, control of apparatus 300, apparatus 300 controlling other devices, and so forth. Communication module 350 may also facilitate communication between apparatus 300 and other apparatuses in the same room, remote apparatuses, remote servers, and so forth.

Apparatus 300 also includes a base module 360. Base module 360 may provide shared services to other modules. These services may include, for example, cooling, power, and so forth. In some examples, base module 360 and/or other modules may be configured so that modules attach to one another in essentially a plug-and-play fashion requiring minimal setup before beginning normal operation once attached to other modules.

Figure 4:
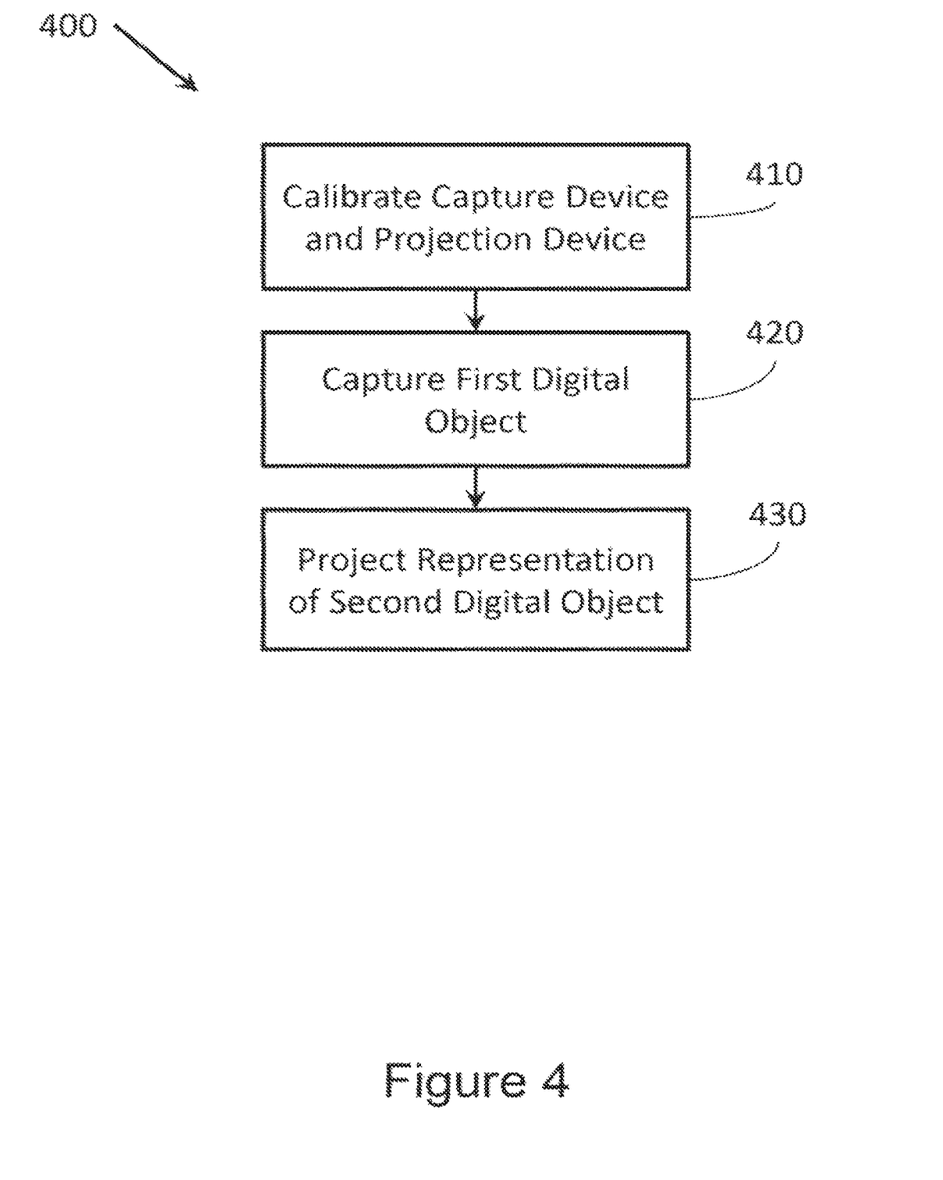
FIG. 4 illustrates a flowchart of example operations associated with room capture and projection.

FIG. 4 illustrates an example method 400 associated with room capture and projection. Method 400 may be embodied on a non-transitory computer-readable medium storing computer-executable instructions. The instructions, when executed by a computer, may cause the computer to perform method 400. In other examples, method 400 may exist within logic gates and/or RAM of an application specific integrated circuit.

Method 400 includes calibrating a capture device and a projection device at 410. The capture device and the projection device may be calibrated to a virtual space and to a physical space. The capture device and the projection device may be calibrated based on attributes of the virtual space. The capture device and the projection device may also be calibrated based on attributes of the physical space. The capture device andi. the projection device may also be calibrated based on locations of the capture device and the projection device within the physical space.

Calibrating the capture device and the projection device to the physical space may include examining a first state of the physical space. Calibrating the capture device and the projection device to the physical space may also include storing a baseline state of the physical space based on the first state. The baseline state may include information describing, for example, light sources, color levels, controllable electronic equipment within the physical space, potential suitable projection locations within the physical space, and so forth. In one example, when calibrating the capture device and the projection device to the physical space, it may be desirable to examine several states of the physical space over time, and to store the baseline state based on the several states.

Method 400 also includes capturing a first digital object at 420. The first digital object may be captured using the capture device. The first digital object may be captured to a virtual space. The first digital object may be associated with an artifact in the physical space. This may facilitate preserving information regarding state changes of the digital object, allowing states of the digital object to be reviewed and/or interacted with.

Method 400 also includes projecting a representation of a second digital object at 430. The second digital object may be projected from the virtual space into the physical space. The second digital object may be projected using the projection device. In various examples, the second digital object may have been stored by capturing information regarding an artifact from, for example, a previous time, a different physical space, and so forth.

Figure 5:
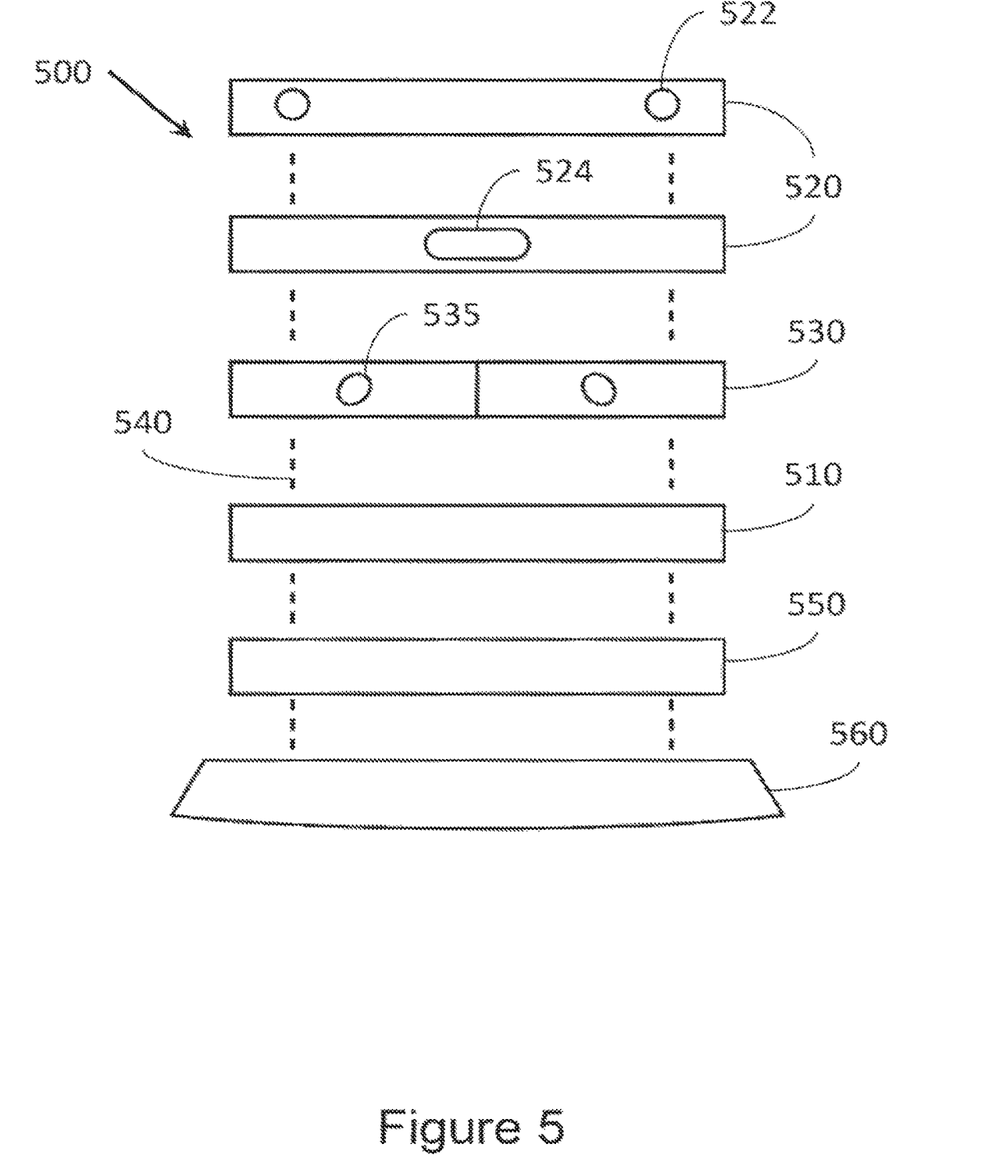
FIG. 5 illustrates an example system associated with room capture and projection.

FIG. 5 illustrates a system 500. System 500 may be made up of a set of interconnecting and stacking wedges. The wedges may be, for example, stacked vertically to add components to system 500. In various examples, adding wedges in differing orientations may increase room coverage of certain features of wedges described below. The set of wedges includes an information management wedge 510. Information management wedge 510 may store information regarding a virtual space.

The set of wedges also includes a capture wedge 520. System 500 illustrates an example set of wedges containing two capture wedges 520. Capture wedges 520 may include a capture device (e.g., capture device 522, capture device 524). Different capture wedges 520 may include different types and/or numbers of capture devices. For example capture device 522 may be a low quality video camera, and capture device 524 may be a high qualify still camera. High quality still cameras may be valuable for capturing high quality images of artifacts in a room that remain unchanged for a period of time to preserve detailed information regarding the artifacts. Lower quality video cameras may be suitable for capturing data regarding artifacts that are frequently moving and/or being modified (e.g., people). The capture devices may capture information regarding a first artifact. The first artifact may reside within a physical space. The information captured regarding the first artifact may be stored in the virtual space as a first digital object.

The set of wedges also includes a projection wedge 530. Projection wedge 530 includes a projection device 535. As illustrated here, projection wedge 535 contains two projection devices, though other projection wedges may have a larger or smaller number of projection devices. The projection device may project a representation of a second digital object from the virtual space into the physical space.

System 500 also includes a connection interface 540. Connection interface 540 may facilitate securely connecting members of the set of wedges. System 500 also includes a communication interface (not shown). The communication interface may facilitate communication between wedges. In one example, the connection interface 540 may ensure the communication interface operably connects the wedges. In this example, the communication interface 540 may be built into the connection interface. Additionally, the wedges and the communication interface may operate in several stacked configurations of the wedges. By way of illustration, though system 500 is illustrated with capture wedges 520 stacked above projection wedge 530, system 500 may also operate with projection wedge 530 above the capture wedges. Depending on attributes of differing physical spaces in which system 500 operates, it may be desirable to stack wedges in differing configurations as system 500 is moved from physical space to physical space.

Other wedges may also be designed to operate with system 500. This example version of system 500 is illustrated with a wedge 550 which may perform a variety of functions. For example, wedge 550 may record and/or play audio, control other electronic devices within the physical space, provide memory to other wedges, store the virtual space and/or digital objects, and so forth.

The example version of system 500 also includes a base wedge 560. Base wedge 560 may provide shared resources to other wedges. The shared resources may include, for example, power, cooling, and so forth. In some examples, base wedge 560 may also facilitate communication between system 500 and external devices.

Figure 6:
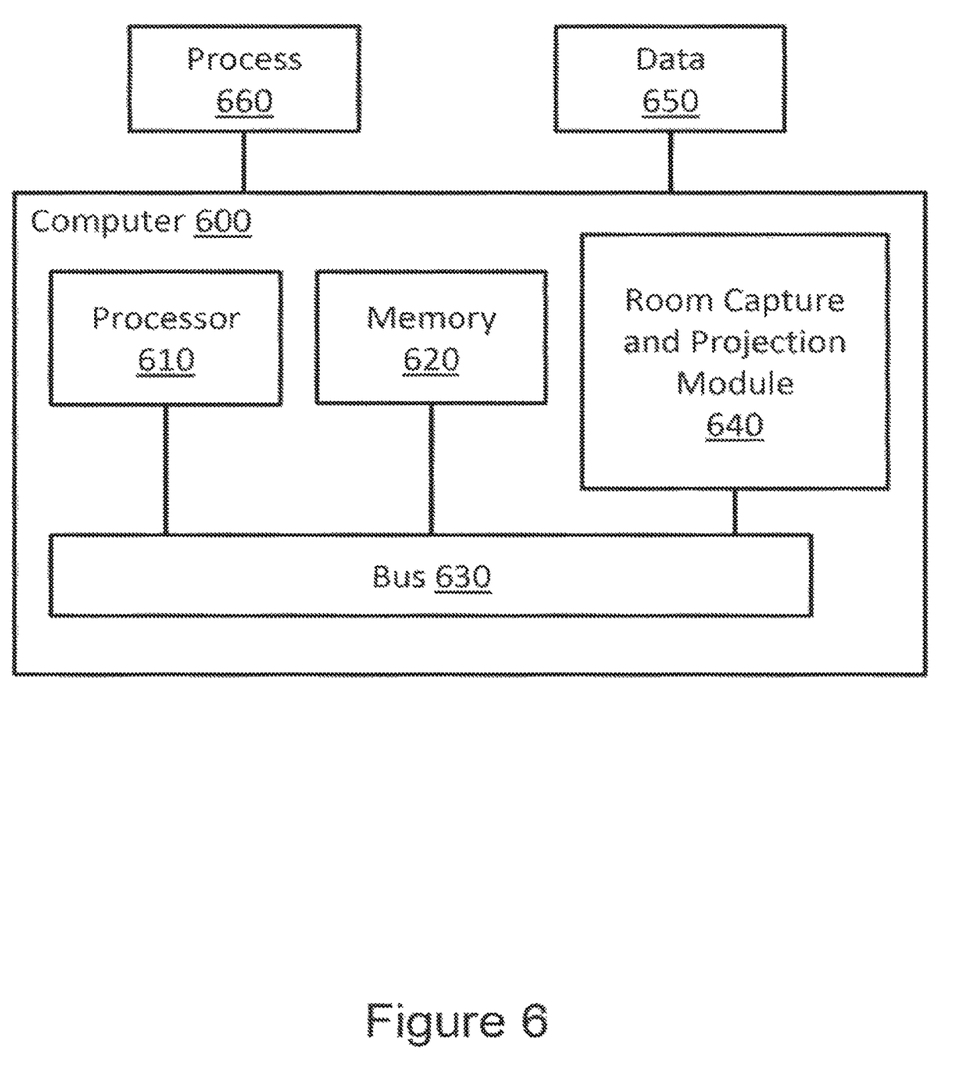
FIG. 6 illustrates an example computing device in which example systems, apparatuses, and methods, and equivalents, may operate.

FIG. 6 illustrates an example computing device in which example systems and methods, and equivalents, may operate. The example computing device may be a computer 600 that includes a processor 610 and a memory 620 connected by a bus 630. The computer 600 includes a room capture and projection module 640. Room capture and projection module 640 may perform, alone or in combination, various functions described above with reference to the example systems, methods, apparatuses, and so forth. In different examples, room capture and projection module 640 may be implemented as a non-transitory computer-readable medium storing computer-executable instructions, in hardware, software, firmware, an application specific integrated circuit, and/or combinations thereof.

The instructions may also be presented to computer 600 as data 650 and/or process 660 that are temporarily stored in memory 620 and then executed by processor 610. The processor 610 may be a variety of various processors including dual microprocessor and other multi-processor architectures. Memory 620 may include non-volatile memory (e.g., read only memory) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 650. Computer 600 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. An apparatus, comprising:
an information management module to maintain information regarding a virtual space and a first digital object within the virtual space, wherein the first digital object is associated with an artifact in a physical space;
a room calibration module to select at least one surface of a plurality of surfaces of the physical space on which to project the virtual space based on information from sensors that indicates attributes of the physical space;
a capture module comprising a camera to record images of the artifact, wherein the capture module is to detect a modification to the artifact based on the images, and wherein the modification to the artifact is maintained by the information management module; and
a projection module to project, based on a signal from the information management module, a representation of a second digital object into the at least one selected surface of the plurality of surfaces of the physical space;
wherein the information management module is further to store first state information of the first digital object that represents a first state of the artifact at a first time, and second state information of the first digital object that represents a second state of the artifact at a second time, wherein the first state of the artifact is determined upon initial detection of the artifact in the physical space by the capture module, wherein the second state of the artifact is determined upon detecting a modification to the artifact, by the capture module, present in the first state, wherein the first state and the second state are different from one another, and wherein the modification includes at least one of: moving the artifact to a different location within the physical space, destroying the artifact, creating the artifact, and interacting with the artifact; and
wherein the projection module is further to project a representation of the first state or the second state of the artifact into the at least one selected surface of the plurality of surfaces of the physical space based on a request to provide the first state or the second state.

2. The apparatus of claim 1, wherein the capture module comprises components to facilitate capture of one or more of: audio, video, and still images associated with the artifact.

3. The apparatus of claim 1, wherein the information management module includes a data store, and wherein the information management module maintains information regarding the virtual space and the first digital object in the data store.

4. The apparatus of claim 1, where the information management module maintains information regarding the virtual space and the first digital object by communicating data regarding the virtual space and the first digital object to a remote server.

5. The apparatus of claim 4, wherein the remote server also communicates with a second apparatus that provides data to the remote server regarding the second digital object, and wherein the remote server provides the data regarding the second digital object to the information management module.

6. The apparatus of claim 1, comprising a base module to provide services to other modules, wherein the services include cooling and power.

7. The apparatus of claim 1, comprising a communication module to facilitate communication between the apparatus and other devices within the physical space.

8. The apparatus of claim 7, where the communication module facilitates communication between the apparatus and the other devices using at least one of: Bluetooth, Wi-Fi, Ethernet, and Universal Serial Bus.

9. The apparatus of claim 1, wherein the attributes comprise at least one attribute that indicates that a surface of the physical space should not be used to project the virtual space, and wherein the at least one surface is selected based further on the indication that the surface of the physical space should not be used to project the virtual space.

10. The apparatus of claim 9, wherein the at least one attribute comprises information indicating that the surface comprises one or more windows that should be avoided.

11. A method, comprising:
calibrating a capture device and a projection device to a virtual space and to a physical space based on attributes of the virtual space, attributes of the physical space, and locations of the capture device and the projection device within the physical space, wherein the capture device comprises a camera;
selecting at least one surface of a plurality of surfaces of the physical space on which to project the virtual space based on the calibration;
capturing, using the camera, images of an artifact in the physical space;
detecting a modification to the artifact based on the images;
projecting, using a projection device, from the virtual space into the at least one selected surface of the plurality of surfaces of the physical space, a representation of a second digital object;
storing first state information of a first digital object that represents a first state of the artifact at a first time, and second state information of the first digital object that represents a second state of the artifact at a second time, wherein the first state of the artifact is determined upon initial detection of the artifact in the physical space by the camera, wherein the second state of the artifact is determined upon detecting a modification to the artifact, by the camera, present in the first state, wherein the first state and the second state are different from one another, wherein the modification includes at least one of: moving the artifact to a different location within the physical space, destroying the artifact, and interacting with the artifact; and
projecting a representation of the first state or the second state of the artifact into the at least one selected surface of the plurality of surfaces of the physical space based on a request to provide the first state or the second state.

12. The method of claim 11, wherein calibrating the capture device and the projection device to the physical space comprises:
examining a first state of the physical space; and
storing a baseline state of the physical space based on the first state of the physical space.

13. The method of claim 12, wherein the baseline state includes information describing at least one of: light levels, light sources, color levels, controllable electronic equipment within the physical space, and potential suitable projection locations within the physical space.

14. The method of claim 11, wherein calibrating the capture device and the projection device to the physical space further comprises examining several states of the physical space over time, and wherein the baseline state is also stored based on the several states.

15. The method of claim 11, further comprising manipulating the projected representation of the second digital object based on colors of the at least one selected surface of the plurality of surfaces of the physical space surfaces onto which the second digital object is projected.

16. A system, comprising:
a set of interconnecting stacking wedges comprising:
an information management wedge to store information regarding a virtual space;
a capture wedge having at least a first camera and at least a second camera configured to produce an image having a different image quality than an image produced by the first camera, the first camera to capture images regarding a first artifact in a physical space to be stored in the virtual space as a first digital object, and the second camera to capture images regarding a second artifact in the physical space to be stored in the virtual space as a second digital object, wherein the capture wedge is to detect a modification to the first artifact based on the images, and wherein the modification to the artifact is maintained by the information management wedge; and
a projection wedge having a projection device to project a representation of the first digital object and the second digital object from the virtual space into the physical space;
a connection interface that facilitates securely connecting members of the set of wedges; and
a communication interface that facilitates communication between the wedges, where the connection interface ensures the communication interface operably connects the wedges;
wherein the information management wedge is further to store first state information of the first digital object that represents a first state of the first artifact at a first time, and second state information of the first digital object that represents a second state of the first artifact at a second time, wherein the first state of the artifact is determined upon initial detection of the artifact in the physical space by the first camera, wherein the second state of the artifact is determined upon detecting a modification to the artifact, by the first camera, present in the first state, wherein the first state and the second state are different from one another, wherein the modification includes at least one of: moving the artifact to a different location within the physical space, destroying the artifact, and interacting with the artifact; and
wherein the projection wedge is further to project a representation of the first state or the second state of the first artifact into the physical space based on a request to provide the first state or the second state.

17. The system of claim 16, wherein the wedges and the communication interface operate in several stacked configurations of the wedges.

18. The system of claim 16, comprising a base wedge to provide shared resources to other wedges including power and cooling, and wherein the base wedge facilitates communication between the system and external devices.

19. The system of claim 16, wherein the first camera is to capture artifacts in motion at a first image quality and the second camera is to capture artifacts not in motion at a second image quality higher than the first image quality.

\* \* \* \* \*